(12) United States Patent
Koshimizu et al.

(10) Patent No.: US 6,908,036 B2
(45) Date of Patent: Jun. 21, 2005

(54) DISPLAY AND RECORD MEDIUM AND INFORMATION WRITER

(75) Inventors: Minoru Koshimizu, Ebina (JP); Daisuke Tsuda, Minato-ku (JP); Ikutaroh Nagatsuka, Ebina (JP); Tsutomu Ishii, Ebina (JP); Yasunori Saito, Ebina (JP); Tsunemasa Mita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/356,604

(22) Filed: Feb. 3, 2003

(65) Prior Publication Data

US 2004/0046036 A1 Mar. 11, 2004

(30) Foreign Application Priority Data

Sep. 5, 2002 (JP) ........................................ 2002-260281

(51) Int. Cl.⁷ .............................................. G06K 19/06
(52) U.S. Cl. ......................................... 235/492; 365/94
(58) Field of Search ................................. 235/380, 375, 235/454, 487, 492; 365/94

(56) References Cited

U.S. PATENT DOCUMENTS

| 5,055,662 | A | * | 10/1991 | Hasegawa | 235/492 |
|---|---|---|---|---|---|
| 5,359,565 | A | * | 10/1994 | Takatori | 365/94 |
| 5,376,781 | A | * | 12/1994 | Dschen | 235/487 |
| 5,412,595 | A | * | 5/1995 | Shannon | 365/108 |
| 6,300,946 | B1 | * | 10/2001 | Lincke et al. | 345/700 |
| 6,375,083 | B2 | * | 4/2002 | Fries et al. | 235/492 |
| 6,388,877 | B1 | * | 5/2002 | Canova et al. | 361/686 |
| 6,402,039 | B1 | * | 6/2002 | Freeman et al. | 235/492 |

* cited by examiner

*Primary Examiner*—Daniel Stcyr
*Assistant Examiner*—Daniel A. Hess
(74) *Attorney, Agent, or Firm*—Oliff & Berridge, PLC (57) ABSTRACT

A display and record medium includes a digital information record section, which is implemented as an IC memory and can record record information in noncontact, and an information display section implemented as a liquid crystal display medium of light write type into which display information can be written. A digital information rewrite section of an information writer communicates with the digital information record section of the display and record medium by electromagnetic waves to rewrite record information as required. A display information rewrite section of the information writer irradiates an optical pattern to the information display section of the display and record medium to rewrite display information. It is possible to rewrite both digital information and display information concurrently in noncontact.

16 Claims, 9 Drawing Sheets

WRITE LIGHT

WRITE LIGHT

FIG. 12 (B)

WRITE LIGHT

DISPLAY AND RECORD MEDIUM AND INFORMATION WRITER

The present disclosure relates to the subject matter contained in Japanese Patent Application No.2002-260281 filed on Sep. 5, 2002, which is incorporated herein by reference in its entirety.

BACKGROUND OF THE INVENTION

1. Field of the Invention

This invention relates to a display and record medium having both a information record unit in which digital information, which can be rewritten in noncontact and a display area into which visible information can be written in noncontact, and an information writer capable of writing (reading) digital information to (from) the display and record medium in noncontact and writing display information in noncontact.

2. Description of the Related Art

In recent years, a card in which information is recorded has become widely available and has been used frequently. For example, a cash card, a credit card, and the like are used more than ever. Information is magnetically written onto the cards, but the cards do not have an information display function. A prepaid card, a point card, and the like are often used; information is magnetically written onto the cards and visible information is also recorded, for example, as the card is punched, the back of the card is printed, etc. The visible information has a role in visualizing information relevant to invisible information magnetically written to the card so as to enable the user to check the information. For example, on a point card, etc., the number of gotten points is recorded as visible information, thereby contributing to promoting the purchase action of the user.

Such cards in related arts use magnetism as a recording method of digital information and thus a contact magnetic head is used to read and rewrite the digital information. To rewrite digital information, the card is inserted into a rewriter and after the card is rewritten, the card is ejected from the rewriter. To record visible information, for example, if printing is performed, a heat-sensitive reversible display and record layer or a thermal transfer record technique for writing an image using a contact thermal head, etc., is often used.

Thus, to rewrite invisible digital information and visible information on the cards in the related arts, a contact rewrite unit is used. Therefore, it is easy to provide a writer complex and make a user operation method common. However, in a contact system, a card must be inserted into the rewriter and mechanical operation such as transport of a card and contact with a card is also required in the rewriter. Thus, the rewriter becomes large in size and the mechanical operation also causes a failure to occur; this is a problem.

Recently, noncontact memory such as IC memory and an RFID tag has been used as a digital information record unit on a card. For example, a commutation ticket or a prepaid card, which an IC card is mounted in and is used at a ticket gate of a train, enables data to be rewritten with being moved simply by bringing the commutation ticket or the prepaid card close to an IC reader/writer when the communication ticket or the prepaid card is passed through the ticket gate.

Thus, it is made possible to rewrite invisible digital information in a noncontact manner, but visible information is not recorded on such a card where digital information is rewritten in noncontact. This is because visible information cannot be rewritten in noncontact and only the type having a heat-sensitive reversible display and record layer or the thermal transfer type described above are available as before. That is, to rewrite visible information, a card needs to be inserted into a dedicated writer for rewriting in contact. It is difficult to provide a complex with a noncontact digital information reader/writer and make a user operation method common. Therefore, the range of application is not widened. This is a problem. As for thermal display information record and erasion, the number of rewritable times is about $1/100$ to $1/1000$ that of noncontact IC, etc. Thus, there is also a problem of being unsuitable for long-term use or application where information is frequently rewritten.

SUMMARY OF THE INVENTION

It is therefore an object of the invention to provide a display and record medium into which new display information can also be written in noncontact concurrently with rewriting new digital information in noncontact, and an information writer, which can concurrently write digital information and display information into the display and record medium.

According to the invention, there is provided a display and record medium including a digital information record unit and an information display unit. In the digital information record unit, information is recorded. The recorded information can be rewritten in noncontact into the digital information record unit. The information display unit displays information. The displayed information can be rewritten in noncontact into the information display unit. Since both digital information and display information can be thus rewritten in noncontact, it is easy to provide a writer complex and make a user operation method common. The contact manner makes it possible to eliminate the need for operation of inserting a card into a writer or the like, and in the writer, the need for mechanical operation of transport of a card, contact with a card, etc., can also be eliminated, and miniaturization and improvement in durability are enabled according to a simpler configuration.

At this time, the noncontact information rewriting into the digital information record unit and the noncontact information rewriting into the information display unit can be executed concurrently. Accordingly, it is made possible to rewrite information rapidly.

Further, the rewriting of the displayed information into the information display unit can be executed by applying an optical pattern. Accordingly, it is made possible to instantaneously write even large-capacity complicated image information into the display and record medium. The record information can be rewritten into the digital information record unit using one of electromagnetic, magnetic, or optical communication units.

The information display unit includes a display layer having a memory function and a photoconductive layer made of a photoconductive member deposited between a pair of opposed electrodes at least one of which has a light transmission property. Such a configuration makes it possible to write a high-definition image instantaneously by light irradiation. Since the display layer has a memory function, energy is not required for retaining the written image so that display can be maintained with no power supply after rewrite.

According to the invention, there is provided an information writer for rewriting recorded information and displayed information in a display and record medium, which includes a digital information record unit in which the recorded information can be rewritten in noncontact and a information display unit in which the displayed information can be rewritten in noncontact. The information writer includes a digital information rewrite unit and a display information rewrite unit. The digital information rewrite unit executes one of electromagnetic, magnetic, and optical communications to rewrite the recorded information in the digital information record unit in noncontact. The display information rewrite unit rewrites the displayed information in noncontact. The digital information rewrite unit may conduct one of electromagnetic, magnetic, and optical communications to read the recorded information from the digital information record unit of the display and record medium.

According to the configuration, new digital information and new display information can be rewritten in noncontact onto the display and record medium in place of the digital information and the display information recorded thereon, so that both rewrite units can be disposed in one unit and transport of a card and the contact part with a card become unnecessary. Therefore, the information writer improved in miniaturization and durability can be provided according to the simpler configuration. User operation can also be made common and the information writer that can be used easily can be provided.

It is made possible to concurrently execute writing of record information into the digital information record unit of the display and record medium by the digital information rewrite unit and writing of display information into the information display unit of the display and record medium by the display information rewrite unit. Accordingly, it is made possible to rewrite information rapidly.

DETAILED DESCRIPTION OF THE PREFERRED EMBODIMENTS

Figure 1:
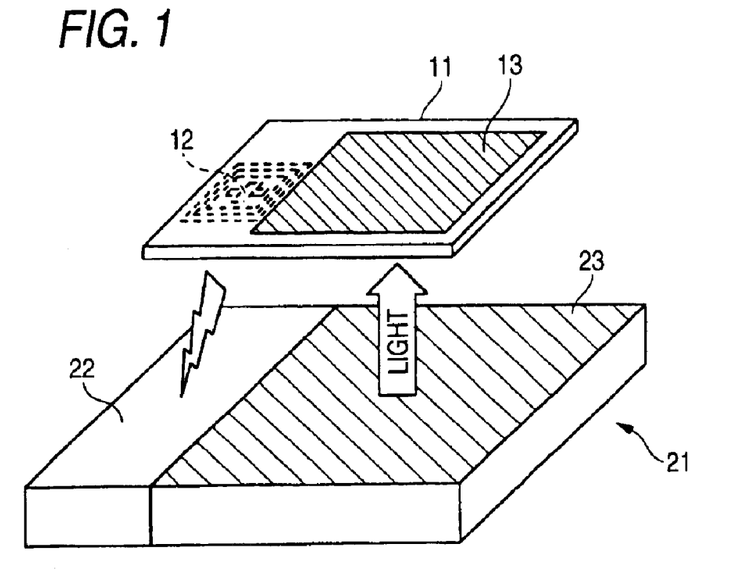
FIG. 1 is a schematic drawing to show an example of the use state of a display and record medium and an information writer according to a first embodiment of the invention.

FIG. 1 is a schematic drawing to show an example of the use state of a display and record medium and an information writer according to a first embodiment of the invention. In the figure, numeral 11 denotes a display and record medium, numeral 12 denotes a digital information record section, numeral 13 denotes an information display section, numeral 21 denotes an information writer, numeral 22 denotes a digital information rewrite section, and numeral 23 denotes a display information rewrite section. The display and record medium 11 includes the digital information record section 12 and the information display section 13. The digital information record section 12 retains digital record information. Record information can be rewritten externally in noncontact. For example, a noncontact IC memory, a noncontact RFID tag, etc., generally known can be used as the digital information record section 12. When an IC memory is used, the digital information record section 12 is mainly made up of an IC chip and an antenna coil and electric power for operating the IC chip is also supplied together with record information by electromagnetic waves. When an RFID tag is used, electromagnetic write is performed. In addition, for example, it may be made possible to write information using radio waves or optically (with visible light, infrared light, etc.,).

The information display section 13 displays information and also enables display information to be rewritten in noncontact. It is desirable that after new display information is rewritten, the information display section 13 should continue to display the display information. It is advisable to use a display device having a memory function. As a write method of display information to the information display section 13, for example, optical pattern irradiation may be executed. To do this, a device including a display layer having a memory function and a photoconductive layer made of a photoconductive member, which are deposited between a pair of opposed electrodes at least either of which has a light transmission property may be used. The information display section 13 is described later in detail.

The information writer 21 is an apparatus for writing record information and display information to the display and record medium 11. The information writer 21 includes the digital information rewrite section 22 and the display information rewrite section 23. The digital information rewrite section 22 rewrites new record information into the digital information record section 12 of the display and record medium 11 in noncontact. The information is written according to a method corresponding to the digital information record section 12 of the display and record medium 11. For example, if the digital information record section 12 of the display and record medium 11 is made up of an IC chip and an antenna coil, the digital information rewrite section 22 is also made up of an antenna coil, a control section, etc., for communicating digital information and supplying electric power. Of course, if the digital information record section 12 of the display and record medium 11 is made up of different components, the digital information rewrite section 22 is made up of components corresponding to the configuration of the digital information record section 12. Therefore, the digital information rewrite section 22 can rewrite record information into the digital information record section 12 of the display and record medium 11 in noncontact by conducting electromagnetic, magnetic, or optical communications.

The information writer 21 may have a function of reading the record information retained in the digital information record section 12 of the display and record medium 11. The information writer 21 can use the read function to write record information while transferring information to and from the display and record medium 11. The timing at which the display information rewrite section 23 rewrites new display information may also be acquired by communicating with the display and record medium 11.

The display information rewrite section 23 rewrites new information into the information display section 13 of the display and record medium 11 in noncontact in place of the information displayed thereon. If information is written into the information display section 13 of the display and record medium 11, for example, by optical pattern irradiation, the display information rewrite section 23 can be implemented as a display. An optical pattern emitted from the display is irradiated to the information display section 13 of the display and record medium 11, whereby new display information may be rewritten. As the display, a general-purpose display such as a CRT, an LCD, an ELD (electroluminescent display), a PDP (plasma display), a VFD (vacuum fluorescent display), or an LED application display can be used. Light of a projection display such as a projector may be used.

In case of using emitted light from the general-purpose display, if the display and record medium 11 is placed at a distance from the display face, scattering of light may make it impossible to write a sharp image. In this case, the display is used in combination with an optical system such as a two-dimensional lens array for forming an image of emitted pattern light on the display and record medium 11 or if the display is an LCD, a directional backlight light source, whereby a sharp image can be written. On the other hand, if a flat panel in which a protective panel on the surface thereof is a film substrate or a slim glass substrate is used, the display and record medium 11 is brought into intimate contact with the panel surface and light is irradiated, whereby blurring of an image can be minimized. In this case, a special optical system is not required so that the configuration can be provided as a simple configuration. Further, in case of using a projection display such as a projector, a deep focal depth is provided and the flexibility of the installation position of the display and record medium 11 is enhanced. Therefore, it is the most desirable mode for accomplishing noncontact write to the display and record medium 11 at some distance.

When the information writer of the invention rewrites new record information and new display information to the display and record medium of the invention as described above, the display and record medium 11 needs only to be held over the information writer 21 as shown in FIG. 1. The digital information rewrite section 22 of the information writer 21 transmits record information by electromagnetic waves, for example, through an internal antenna to the digital information record section 12 of the display and record medium 11, and the digital information record section 12 of the display and record medium 11 receives the record information through an internal antenna and the record information is rewritten into the digital information record section 12 in noncontact. The display information rewrite section 23 of the information writer 21 irradiates an optical pattern, for example, emitted from the display to the information display section 13 of the display and record medium 11. Upon reception of the irradiated optical pattern at the information display section 13 of the display and record medium 11, new display information is rewritten in place of the display information held in an internal display element having a memory function. Rewriting of the display information is also conducted in noncontact manner.

Rewriting of record information and rewriting of display information are performed separately and thus can be conducted concurrently; high-speed writing can be preformed. In case of optically rewriting display information, even if an image of a large information amount is written, rewriting is performed in an instant and thus display information can be rewritten in a very short time. Further, the user can rewrite record information and display information simply by holding the display and record medium 11 over the information writer 21. The information display section 13 having a configuration described later can continue to display the rewritten display information, so that the display information can be referenced at any time.

The image writer 21 does not have a mechanical configuration for transporting the display and record medium 11 as in the related art at the writing time. Therefore, the image writer 21 can be miniaturized with a simple structure and failures can be decreased.

The display and record medium 11 will be discussed in more detail. In the following description, a case in which an optical pattern is irradiated from the back of the display and record medium 11 to write display information into the information display section 13 will be described. FIGS. 2A and 2B are sectional views to show the display and record medium according to the first embodiment of the invention. In the figure, numeral 14 denotes a transparent substrate. The digital information record section 12 and the information display section 13 are supported integrally by a common support substrate in the example shown in FIG. 2A. Here, it is assumed that light emitted from the display information rewrite section 23 of the information writer 21 is irradiated to the back of the display and record medium 11 as described above. Thus, the back of the information display section 13 needs to be made transparent. In the example, a transparent material is used as the support substrate. The support substrate is a transparent substrate 14. In case of writing display information by irradiating only light of a specific wavelength, the back of the information display section 13 is not necessary to be transparent so long as the back allows the wavelength to pass therethrough.

Of course, the transparent substrate 14 is not necessary to be formed. As shown in FIG. 2B, the digital information record section 12 such as IC memory and RFID tag may be put directly on a surface of a display medium prepared as the information display section 13. It is also possible to place the whole of them in one piece by lamination treatment, etc. At that time, preferably the digital information record section 12 is put on a nondisplay area of the information display section 13. In the digital information record section 12, for example, an antenna part can also be wired in a display area of the information display section 13 by using a transparent material.

Figure 3:
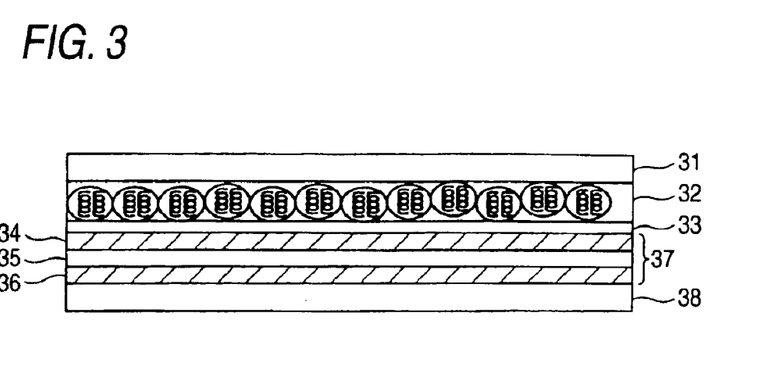
FIG. 3 is a sectional view to show an example of the information display section 13 in the display and record medium according to the first embodiment of the invention.

FIG. 3 is a sectional view to show an example of the information display section 13 in the display and record medium according to the first embodiment of the invention. In the figure, numeral 31 denotes an upper transparent electrode substrate, numeral 32 denotes a liquid crystal display layer, numeral 33 denotes a light absorption layer, numerals 34 and 36 denote charge generation layers, numeral 35 denotes a charge transport layer, numeral 37 denotes a photoconductive layer, and numeral 38 denotes a lower transparent electrode substrate. In the configuration example of the information display section 13 shown in FIG. 3, for example, an ink in which microcapsules containing liquid crystal is dispersed in a resin binder is applied to form the liquid crystal display layer 32. The photoconductive layer 37 (charge generation layer 34, charge transport layer 35, and charge generation layer 36) is deposited on the liquid crystal display layer 32 via the insulating light absorption layer 33. The layers are sandwiched between a pair of electrode substrates (the upper transparent electrode substrate 31 and the lower transparent electrode substrate 38).

Adopting the microcapsule composition as the liquid crystal display layer 32 is a preferred mode. This is because making the whole display area flexible is facilitated and if some stress is applied, it is absorbed and disorder of display information can be avoided. At this time, preferably the liquid crystal in the microcapsule has a memory property in an orientational state. Specifically, ferroelectric liquid crystal such as chiral smectic C phase, and chiral nematic liquid crystal material, smectic liquid crystal material, and discotheque liquid crystal material can be named. Particularly preferably, the liquid crystal in the microcapsule is a display material mainly including chiral nematic liquid crystal from viewpoints of being capable of producing color display using a selective reflection wavelength characteristic at a high reflection factor without the need for any polarizing plate or any color filter and being capable of displaying a high-definition image at a high contrast. In case of producing color display, a plurality of liquid crystal display layers 32 may be deposited on each other.

As the material of the photoconductive layer 37, either inorganic material or organic material may be used. As the inorganic material, for example, selenium, amorphous silicon, zinc oxide, BSO, etc., are named. Among them, amorphous silicon is preferred because amorphous silicon is a material widely used with a solar battery, etc. However, if an electronic medium uses a flexible substrate, an organic material having good suitability for the substrate and not requiring high-temperature thermal treatment or a manufacturing process taking time is more preferred. As the organic material, for example, a material used as a photoconductor in an electrophotographic process can be used. Some organic materials are materials for performing charge generation and charge transport at the same time, and can also be applied. However, a material having a composition functionally separated into a charge generation layer and a charge transport layer is often used from the viewpoint of showing a good light-sensitive characteristic. The photoconductive layer 37 shown in FIG. 3 has a multi-layer structure including the charge generation layer 34, the charge transport layer 35, and the charge generation layer 36 deposited in order. Such a configuration is preferred in that a good sensitive characteristic is provided, that an AC voltage can be applied to the liquid crystal display layer 32, and that a general-purpose liquid crystal material can be used as the liquid crystal display layer 32.

It is also possible to form a functional layer for preventing carriers from rushing between the lower transparent electrode substrate 38 and the charge generation layer 36. Such a functional layer can be applied so long as a current flow is not remarkably hindered. Further, a configuration can also be applied in which an additional charge generation layer is formed in the charge transport layer 35 at the center so that the charge generation layer, the charge transport layer, the charge generation layer, the charge transport layer, and the charge generation layer are deposited in order. The light absorption layer disposed between the charge generation layer and the display layer may be of a single-layer or multi-layer structure.

As the material used as the charge generation layer, an organic material for generating charges upon irradiation of light such as a perylene series, a phthalocyanine series, a bisazo series, a dithiopitokero pyrrole series, a squalelium series, an azurenium series, a thiapyrilium polycarbonate series, etc., can be named. As a formation method of the charge generation layer, not only a dry film formation method such as vacuum evaporation, sputtering but also spin coating or dip coating using a solvent or a dispersing agent and an application method using an applicator, etc., can be applied.

As the material used as the charge transport layer, a trinitrofluorene series, a polyvinyl carbazole series, an oxadiazole series, a pyrarizone series, a hydrazone series, a stilbene series, a triphenyl amine series, a triphenyl methane series, a diamine series, etc., can be named. An ion conductive material such as polyvinyl alcohol or polyethylene oxide to which $LiClO_4$ is added can also be applied. As a formation method of the charge transport layer, a similar method to the method that can be applied to formation of the charge generation layer can be named.

A pair of electrode substrates between which the liquid crystal display layer 32, the insulating light absorption layer 33, and the photoconductive layer 37 are sandwiched is formed of transparent materials as the upper transparent electrode substrate 31 and the lower transparent electrode substrate 38. The upper transparent electrode substrate 31 is formed of a transparent material to make an external light beam incident on the liquid crystal display layer 32 and emit light reflected at the liquid crystal display layer 32. The lower transparent electrode substrate 38 is also formed of a transparent material to cause write light from the information writer 21 to arrive at the photoconductive layer 37.

Figure 2:
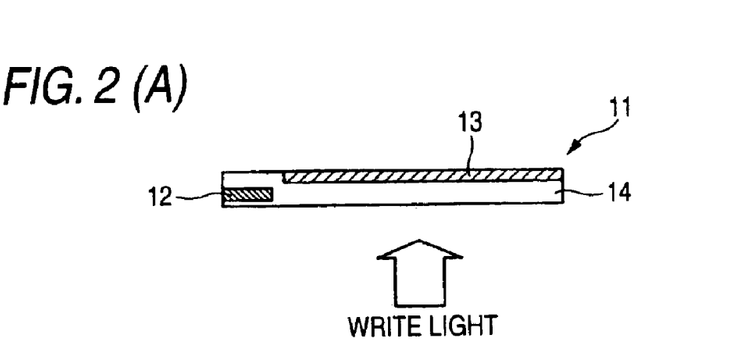
FIGS. 2A and 2B are sectional views to show the display and record medium according to the first embodiment of the invention.

As the upper transparent electrode substrate 31 and the lower transparent electrode substrate 38, substrates using glass, plastic, etc., as material can be named. The substrate using a plastic material is preferable since the plastic material is excellent in mechanical-resistant characteristic from the outside. As the substrate using a plastic material, for example, a polyesteric film such as polyethylene terephthalate, and polycarbonate, polyimide, etc., can be named. If the lower transparent electrode substrate 38 is protected by the transparent substrate 14 as shown in FIG. 2, the material used as the lower transparent electrode substrate 38 can be selected without much considering the mechanical-resistant characteristic.

The material of the electrode having a light transmission property, formed on the surface of the substrate material is not limited so long as the material is a transparent member in which incidence light is hard to undergo scattering, is electrically conductive, and can function as an electrode. For example, metal oxide such as ITO (indium-tin oxide) or tin dioxide can be named. An electrically conductive ceramic material, etc., can also be used. Electrically conductive film can be formed on the substrate by a known method such as evaporation, sputtering, or CVD.

If the information display section 13 includes the liquid crystal display layer 32 mainly having microcapsule liquid crystal and the photoconductive layer 37 deposited on each other, the layers 32 and 37 being sandwiched between the opposed electrodes, as shown in FIG. 3, it is necessary to apply a voltage to the opposed electrodes together with irradiation of light at a time when the display information is written. The applied voltage may be supplied from an external power supply or may be held in the display and record medium 11 in the form of a battery. When an optical pattern is irradiated to the photoconductive layer 37 in a state in which a predetermined voltage is applied to the opposed electrodes from the outside of the display and record medium 11 or an internal voltage application unit, the impedance of the photoconductive layer 37 in the light irradiated part lowers and the strength of the electric field applied to the microcapsule liquid crystal of the liquid crystal display layer 32 deposited in the portion is raised so that the orientation state of the microcapsule liquid crystal is changed. Since the impedance of the photoconductive layer 37 in the portion to which light is not irradiated remains high, a difference occurs in the orientation state of the liquid crystal. Thus, a reflection image is formed. At this time, to synchronize the voltage application timing and the light irradiation timing with each other, a control section for applying the voltage based on an electric trigger detected by a sensor may be provided.

The information display section 13 of the display and record medium 11 of the invention is not necessarily limited to that shown in FIG. 3, and may be any form so long as the information display section 13 enables information to be written in noncontact. For example, as the liquid crystal display layer 32, in addition to the above-described configuration, a liquid crystal compound dispersed in a polymeric material, a polymeric material a little mixed in a liquid crystal material, a liquid crystal compound being a polymeric compound, or the like can also be adopted. Further, like a display element of a technique called electrophoresis or toner display, an element for producing display by reversibly controlling move of one or more types of charge color fine particles existing in liquid or air by an external applied electric field, an element for producing display by rotating particles painting areas different in surface charge state in different colors, an element for producing display by mechanically or electrically changing the orientation and positions of minute pixels, or the like can also be applied.

Figure 4:
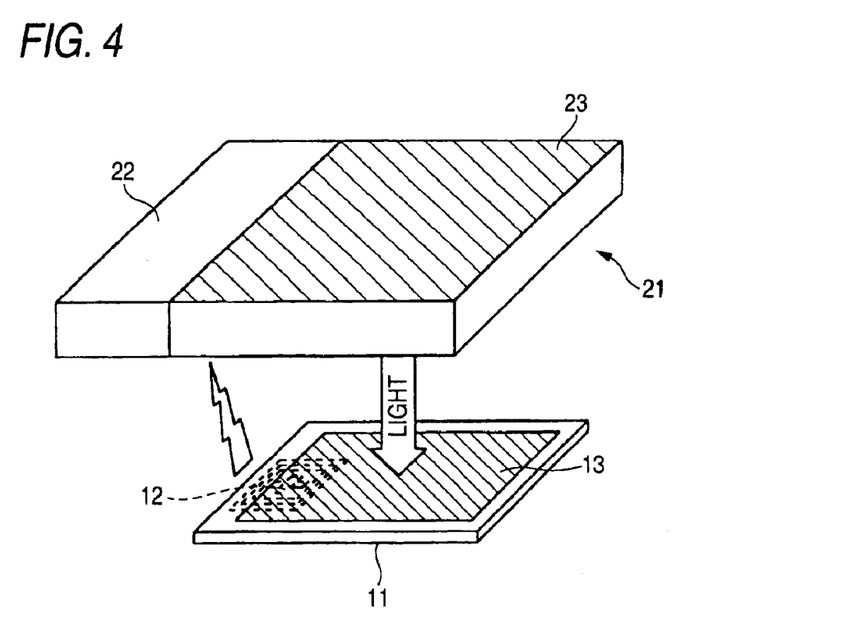
FIG. 4 is a schematic drawing to show an example of the use state in a display and record medium and an information writer according to a second embodiment of the invention.

FIG. 4 is a schematic drawing to show an example of the use state in a display and record medium and an information writer according to a second embodiment of the invention. Parts similar to those previously described with reference to FIG. 1 are denoted by the same reference numerals in FIG. 4 and will not be discussed again. In the second embodiment, an example is shown in which light is irradiated writing display information from a front surface of a display and record medium 11 to write display information. Digital information is transmitted and received in noncontact by electromagnetic waves, etc., as with the first embodiment previously described with reference to FIG. 1.

In the display and record medium 11 having such a configuration, it is not necessary to consider transmission of light with regard to the back thereof. Thus, it is possible to overlay an information display section 13 on a digital information record section 12 as shown in FIG. 4. Therefore, it is possible to dispose the digital information record section 12 in any desired position such as the center.

An information writer 21 is similar to that in the first embodiment. However, an image displayed by a display information rewrite section 23 has mirror image relationship with the image displayed in the first embodiment.

FIGS. 5A and 5B are sectional views to show the display and record medium according to the second embodiment of the invention. In FIG. 5A, numeral 15 denotes a substrate. In the example shown in FIG. 5A, the digital information record section 12 and the information display section 13 are supported integrally by the common substrate 15. In the second embodiment, transmission of light need not be considered with regard to the back. Thus, a configuration of depositing the digital information record section 12 in the layer direction below the information display section 13 as shown in FIG. 5B can be adopted.

Of course, also in the second embodiment, the digital information record section 12 may be put directly on a display medium prepared as the information display section 13, as shown in FIG. 5B, as in the first embodiment. It is also possible to dispose the whole of them in one piece by lamination treatment, etc. At this time, in the second embodiment, the digital information record section 12 may be put on any desired position of the back of the information display section 13.

Thus, in the second embodiment, the back of the display and record medium 11 may be opaque so that the back can be used as desired. It is possible to use the back in various applications such as use for design of the medium, print of a caution, and a print side like a prepaid card.

Figure 6:
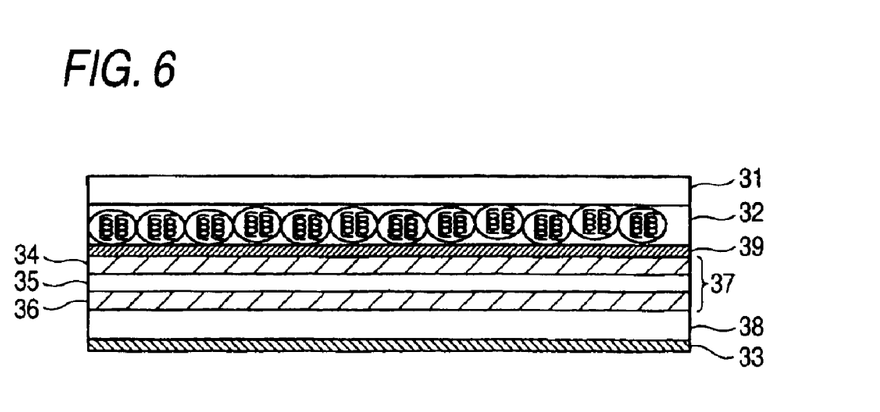
FIG. 6 is a sectional view to show an example of the information display section 13 in the display and record medium according to the second embodiment of the invention.

FIG. 6 is a sectional view to show an example of the information display section 13 in the display and record medium according to the second embodiment of the invention. Parts similar to those previously described with reference to FIG. 3 are denoted by the same reference numerals in FIG. 6 and will not be discussed again. Numeral 39 denotes an isolation layer. As the internal structure of the information display section 13, the structure as shown in FIG. 6 can be adopted. For example, an ink in which microcapsules containing liquid crystal is dispersed in a resin binder is applied to form the liquid crystal display layer 32 as with the first embodiment. A photoconductive layer 37 can be deposited on the liquid crystal layer 32 via the insulating transparent isolation layer 39. The layers can be sandwiched between a pair of electrode substrates (an upper transparent electrode substrate 31 and a lower transparent electrode substrate 38). Further, to prevent irradiated light incident from the surface from being reflected, a light absorption layer 33 is applied onto the surface of the lower transparent electrode substrate 38. The light absorption layer 33 may serve as both electrode substrate and light absorption member. Also, light absorption material may be disposed on the lower electrode.

As the material of the liquid crystal display layer 32, in addition to the material described above, any of various materials can be adopted as with the first embodiment. The photoconductive layer 37 can also be formed using a similar material to that in the first embodiment according to a similar process to that in the first embodiment.

Since light from the back need not be transmitted in the second embodiment, the lower transparent electrode substrate 38 need not be transparent. Therefore, the material of the lower transparent electrode substrate 38 can be adopted regardless of light transmission property. When the lower electrode substrate is not transparent, the light absorption layer 33 may be disposed between the photoconductive layer 37 and the electrode substrate, for example. Accordingly, the display performance can be improved.

Figure 7:
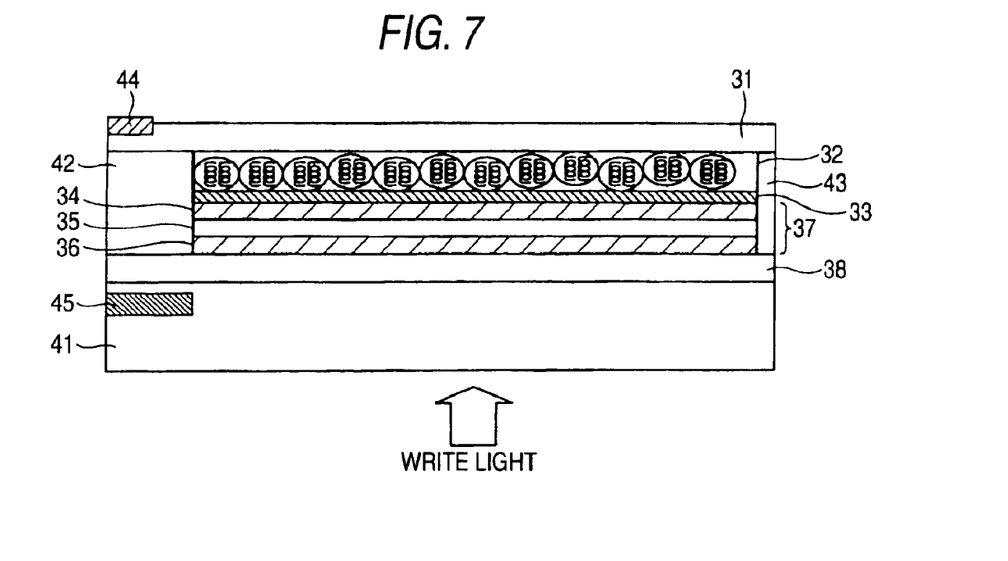
FIG. 7 is a sectional view of a display and record medium adopted in a first specific example of the invention.

Several specific examples of the display and record medium and the information writer will be described below. FIG. 7 is a sectional view of display and record medium adopted in a first specific example of the invention. Parts similar to those previously described with reference to FIGS. 1 to 3 are denoted by the same reference numerals in FIG. 7. Numeral 41 denotes a transparent card substrate, numerals 42 and 43 denote seal members, numeral 44 denotes an external electrode terminal, and numeral 45 denotes an IC memory.

The whole configuration is similar to the configuration previously described with reference to FIGS. 1 to 3 in the first embodiment. That is, a display and record medium 11 is roughly divided into a portion forming an information display section 13 and a portion forming a digital information record section 12, which are disposed in one piece on the transparent card substrate 41 made of acrylic resin as a support, so as to implement the card-like display and record medium 11. In the first specific example, the IC memory 45 for implementing the digital information record section 12 is embedded in the transparent card substrate 41 made of acrylic resin having a light transmission property. The information display section 13 is bonded to the card surface.

The information display section 13 is a display medium sandwiched between an upper transparent electrode substrate 31 and a lower transparent electrode substrate 38 of PET film substrates having a pair of transparent electrodes. The outer form of the information display section 13 including a nondisplay area has almost the same size and shape as the card member, which is the support. The portion in which the IC memory 45 is embedded is an area where no image is displayed, and is used as an area to connect the internal electrode of the information display section 13 and the external electrode terminal 44.

An ink in which microcapsules containing liquid crystal is dispersed in a resin binder is applied to form the liquid crystal display layer 32. A photoconductive layer 37 is deposited on the liquid crystal display layer 32 via an insulating light absorption layer 33. The layers are sandwiched between a pair of electrode substrates (the upper transparent electrode substrate 31 and the lower transparent electrode substrate 38). The photoconductive layer 37 is of a three-layer structure including a charge generation layer 34, a charge transport layer 35, and a charge generation layer 36 deposited in order from the insulating light absorption layer 33 to the lower transparent electrode substrate 38. The seal members 42 and 43 seal the surroundings of the layers.

The configuration and manufacturing method of the information display section 13 will be discussed in detail. To form the information display section 13, the light absorption layer 33, the photoconductive layer 37, and the liquid crystal display layer 32 including chiral nematic liquid crystal material contained in microcapsules are deposited so that the layers 32, 33, and 37 are sandwiched between two PET film substrates (trade name: HIGH BEAM, manufactured by Toray Industries Inc.) (the upper transparent electrode substrate 31 and the lower transparent electrode substrate 38) each formed an ITO (indium tin oxide) electrode film therein.

With regard to the liquid crystal display layer 32, 74.8 parts of nematic liquid crystal E8 (manufactured by Merck Ltd.) having positive dielectric constant anisotropy, 21 parts of chiral agent CB15 (manufactured by BDH), and 4.2 parts of chiral agent R1011 (manufactured by Merck Ltd.) are heated and dissolved and, then, are restored to the room temperature to obtain chiral nematic liquid crystal for selectively reflecting blue green light. Three parts of additive including three moles of xylene di-isocyanate and one mole of trimethylolpropane (D-110N manufactured by Takeda Chemical Industries, Ltd.) and 100 parts of ethyl acetate are added to 10 parts of blue green chiral nematic liquid crystal to form a uniform solution. Liquid having an oil phase is prepared.

On the other hand, 10 parts of polyvinyl alcohol (polyvinyl alcohol 217EE manufactured by Kuraray Co., Ltd.) are added to 1000 parts of heated ion-exchanged water and they are agitated and then are set aside until cooling. Whereby liquid having an aqueous phase is prepared.

Next, the above-described oil phase is emulsification-dispersed in the aqueous phase prepared by setting aside until cooling for one minute by a mixer to prepare an oil-in-water emulsion in which oil phase droplets are dispersed in the aqueous phase. The oil-in-water emulsion is agitated for two hours while the oil-in-water emulsion is heated in a 60° C. water bath and interfacial polymerization is completed to form liquid crystal microcapsules. The average particle size of the liquid crystal microcapsules is estimated to be about 12 $\mu$m by a laser particle size distribution meter.

Microcapsule-dispersed liquid is passed through a stainless mesh net with each mesh having 38 $\mu$m and is filtered. Then, the microcapsule-dispersed liquid is left stand for 24 hours and milky-white supernatant liquid is removed so that slurry having about 390% by mass of a solid component including microcapsules is obtained.

A solution of 10% by weight of polyvinyl alcohol containing polyvinyl alcohol having two third of the weight of the solid component consisting of microcapsules is added to the slurry, thereby preparing application liquid.

The application liquid is applied with a #44 wire bar onto a PET film including an ITO of 125 $\mu$m in thickness (TORAY HIGH BEAM), which becomes the upper transparent electrode substrate 31, thereby forming the liquid crystal display layer 32.

Next, photoconductive layer 37 made of an organic material is formed on the electrode of the substrate including the ITO electrode, which becomes the lower transparent electrode substrate 38. The photoconductive layer 37 includes the charge transport layer 35 sandwiched between the charge generation layers 34 and 36.

A method of forming the photoconductive layer 37 is as follows: First, as the first charge generation layer 36 of the photoconductive layer 37 on the ITO electrode, a propanol dispersion liquid in which hydroxy gallium phthalocyanine and polyvinyl butyral, which is binder resin, are mixed at 1:1 is applied to the substrate by spin coating and then is dried and is formed to a thickness of 0.2 $\mu$m. Next, as the charge transport layer 35 on the formed charge generation layer 36, first, charge transport material N,N-Bis(3,4-dimethylphenyl) biphenyl-4-amine and binder resin polycarbonate bisphenol-Z, (poly(4,4'-cyclohexylidene diphenylene carbonate)) are mixed at a ratio of 40% by weight and 60% by weight. Then, the mixture is dissolved in monochlorobenzene to prepare a 10% solution. This solution is pulled up at a velocity of 120 mm/minute by dip coating to form the charge transport layer 35 having 3 $\mu$m in thickness on the charge generation layer 36. Further, the second charge generation layer 34 is formed to have 0.2 $\mu$m in thickness with a similar material to that of the first charge generation layer 36 according to a similar procedure to that of the first charge generation layer 36. On the second charge generation layer 34, a PVA (polyvinyl alcohol) layer is formed to have 0.2 $\mu$m in thickness by spin coating as a light absorption layer 33. Further, on the light absorption layer 33, a black resin BKR-105 (manufactured by Nippon Kayaku Co., Ltd.) is applied by spin coating as a light shield layer (not shown).

Dick dry WS-321A/LD-55 of a complete aqueous dry laminate adhesive (manufactured by Dainippon Ink and Chemicals, Incorporated) is applied onto the PVA face of the PET film forming the photoconductive layer 37 and is dried to form an adhesion layer having 4 µm in thickness. Then, the photoconductive layer 37 is brought into intimate contact with the top of the liquid crystal display layer 32 including the microcapsule chiral nematic liquid crystal described above. Laminating is performed at 70° C. to obtain the sheet-like information display section 13. At this time, wiring from the internal transparent electrode is pulled out to the sheet surface portion. A metal tape with a conductive adhesive material for reinforcement is put on the wiring to form the external electrode terminal 44.

The sheet-like information display section 13 prepared according to the described method is made integral by an adhesive with the surface of the card-like acrylic resin in which the IC memory 45 is previously embedded in the transparent card substrate 41, to prepare the display and record medium 11.

Figure 8:
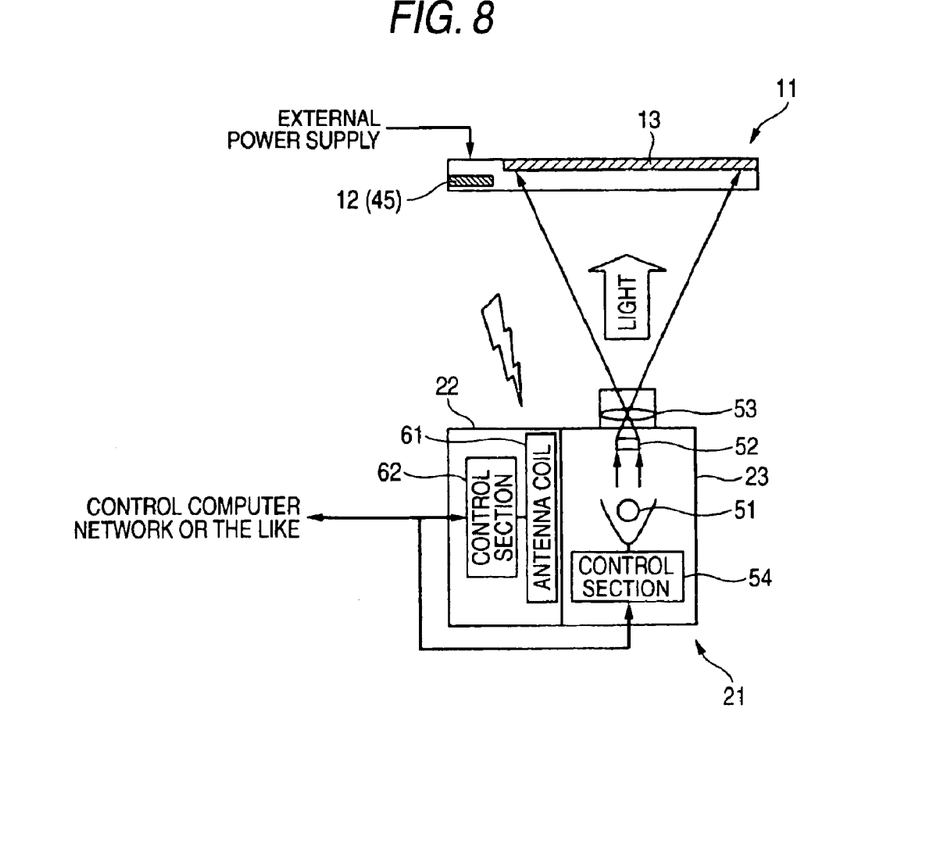
FIG. 8 is a drawing to show the configuration of an information writer adopted in the first specific example of the invention.

Next, the specific configuration of an information writer 21 for writing digital information and display information into the display and record medium 11 in noncontact will be discussed. FIG. 8 is a drawing to show the configuration of the information writer adopted in the first specific example of the invention. Parts similar to those previously described with reference to FIG. 1 are denoted by the same reference numerals in FIG. 8. Numeral 51 denotes a light source, numeral 52 denotes a light modulator, numeral 53 denotes a projection lens, numeral 54 denotes a control section, numeral 61 denotes an antenna coil, and numeral 62 denotes a control section. The information writer 21 is roughly divided into a display information rewrite section 23 and a digital information rewrite section 22. The display information rewrite section 23 projects an optical pattern to the information display section 13 of the display and record medium 11. The digital information rewrite section 22 writes/reads data into/from an IC memory according to an electromagnetic induction technique, for example, and supplies electric power. The display information rewrite section 23 mainly includes the light source 51, the light modulator 52, the projection lens 53, and the control section 54. The digital information rewrite section 22 includes the antenna coil 61 and the control section 62. The control sections 54 and 62 are connected to a control computer, etc., via a network, etc. The control computer also controls image information generated in the light modulator 52 of the display information rewrite section 23 for irradiating an optical pattern.

Figure 9:
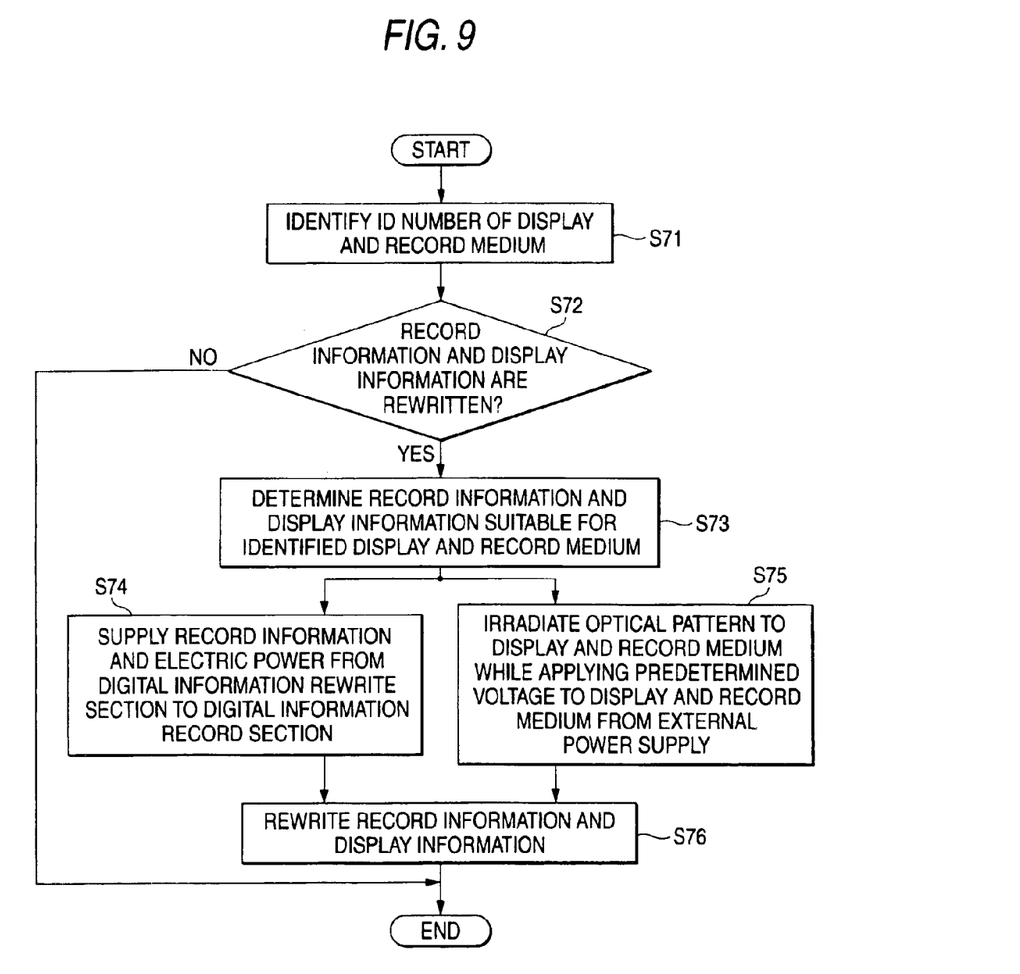
FIG. 9 is a flowchart to show an outline of a writing procedure of record information and display information in the first specific example of the invention.

Next, a procedure for the information writer 21 to write record information and display information into the display and record medium 11 will be discussed. FIG. 9 is a flowchart to show an outline of the writing procedure of record information and display information in the first specific example of the invention. To begin with, when the display and record medium 11 is brought close to the data readable range of the information writer 21, the digital information rewrite section 22 reads record information in the IC memory 45 disposed in the digital information record section 12 of the display and record medium 11 and identifies an ID of the display and record medium 11 (S71).

Next, the control computer, etc., is asked about the record information and display information to be rewritten (or not to be rewritten) into the display and record medium 11. At this time, the control computer can also access a database or a host control computer via a network and make an inquiry about the information to be rewritten in some cases. Whether or not the information to be rewritten exists is determined at S72. If the information to be rewritten does not exist, the processing is terminated without rewriting, etc.

When the information to be rewritten exists and record information and display information are received from the control computer and the information to be written is determined (S73), the digital information rewrite section 22 rewrites the record information in noncontact (S74). Concurrently, while a predetermined voltage is applied to the display and record medium 11 from the external power supply, the display information is projected from the display information rewrite section 23 (S75). Accordingly, the record information and the display information are written (S76).

When irradiation of the optical pattern is completed and the external voltage application is released, an image having high contrast is formed in which the liquid crystal is, based on the irradiated light pattern, in a planer state indicating green selection wavelength reflection or in a focal conic state indicating a background color (here, black of the light absorption layer). Moreover, the display and record medium 11 shows high image preservation and mechanical-resistant characteristics at the handling time because the chiral nematic liquid crystal is contained in the microcapsules as the liquid crystal display layer 32.

Figure 10:
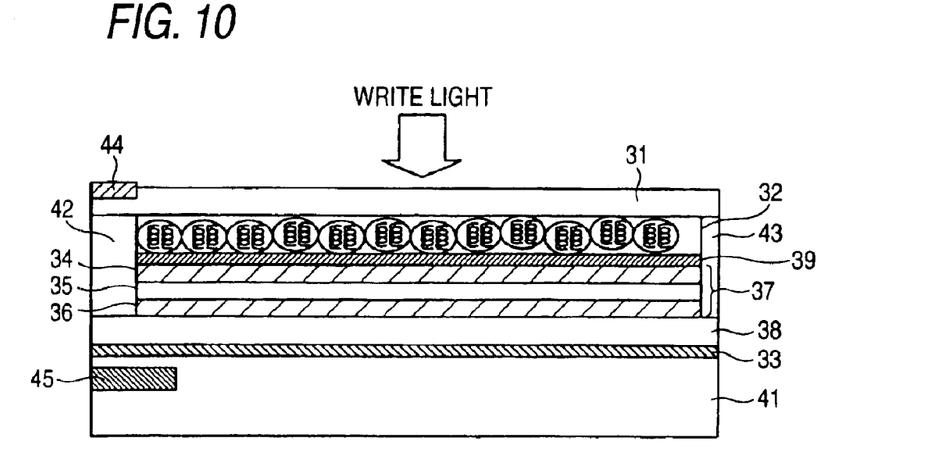
FIG. 10 is a sectional view of a display and record medium adopted in a second specific example of the invention.

Next, a second specific example of display and record medium and information writer of the invention will be discussed. FIG. 10 is a sectional view of a display and record medium adopted in the second specific example of the invention. Parts similar to those previously described with reference to FIGS. 4 to 7 are denoted by the same reference numerals in FIG. 10. The second specific example conforms to the second embodiment.

Display information can be written into a display and record medium 11 in the second specific example by irradiating an optical pattern from a front surface thereof. The display and record medium 11 in the second specific example differs from that in the first specific example previously described with reference to FIG. 7 in that the light absorption layer between the liquid crystal display layer 32 and the photoconductive layer 37 in FIG. 7 is changed to a transparent insulating isolation layer 39 and that a light absorption layer 33 is applied to the surface of a lower transparent electrode substrate 38. A method of preparing layers of the liquid crystal display layer 32, etc., is similar to that in the first specific example and therefore will not be discussed again.

Figure 11:
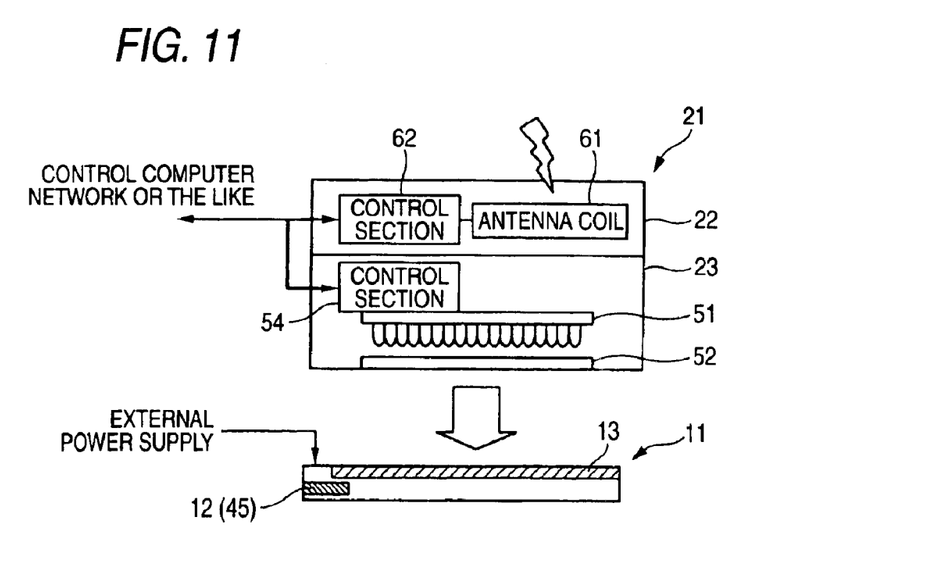
FIG. 11 is a drawing to show the configuration of an information writer adopted in the second specific example of the invention.

FIG. 11 is a drawing to show the configuration of the information writer adopted in the second specific example of the invention. Parts similar to those previously described with reference to FIG. 8 are denoted by the same reference numerals in FIG. 11 and will not be discussed again. To use the display and record medium 11 as shown in FIG. 10, it is also possible to use an information writer 21 similar to that in the first specific example previously described with reference to FIG. 8. In the example shown in FIG. 11, some modifications are made; a directional backlight source (a two-dimensional array of directional LED lamps) is used as a light source 51 and an LCD panel is used as a light modulator 52. In the configuration, since the directivity of the light source 51 is used, no projection lens 53 is provided. Such a configuration enables the writer to be made smaller than that in the first specific example.

Figure 5:
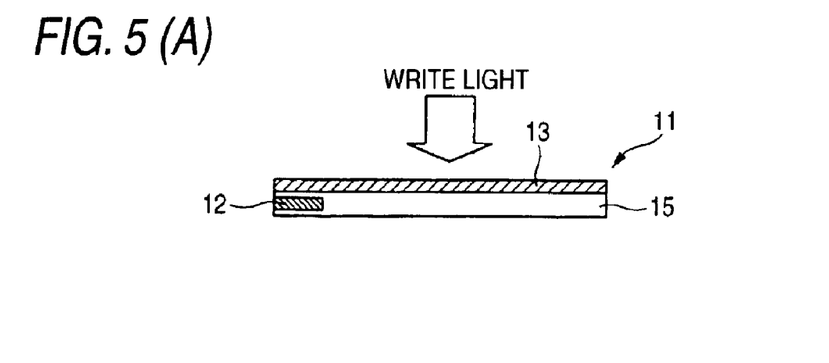
FIGS. 5A and 5B are sectional views to show the display and record medium according to the second embodiment of the invention.
Figure 12:
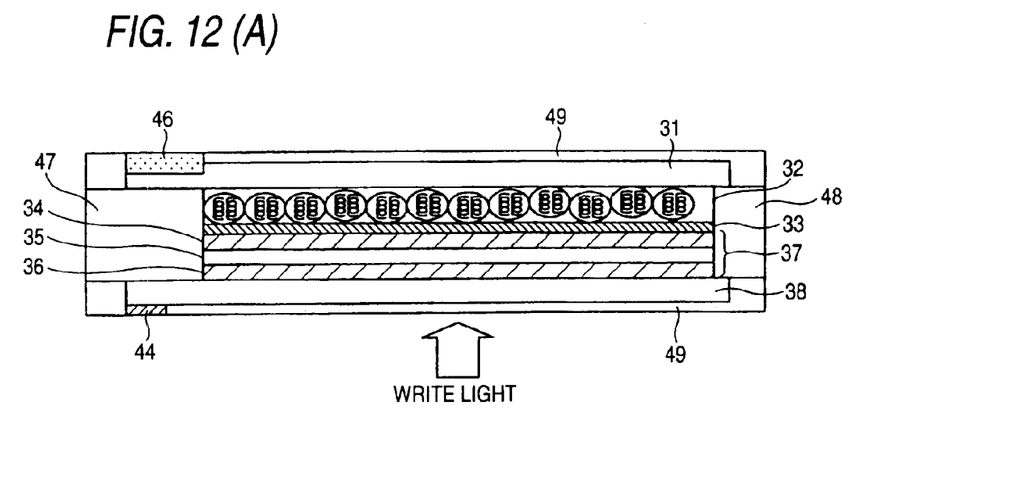
FIGS. 12A and 12B are sectional views of a display and record medium adopted in a third specific example of the invention.

Next, third specific examples of display and record medium and information writer of the invention will be discussed. FIGS. 12A and 12B are sectional views of a display and record medium adopted in the third specific example of the invention. Parts similar to those previously described with reference to FIGS. 1 to 7 and 10 are denoted by the same reference numerals in FIGS. 12A and 12B and will not be discussed again. Numeral 46 denotes an RFID tag, numerals 47 and 48 denote adhesives, and numeral 49 denotes a laminate film. In the third specific example, as a digital information rewrite section 22, the RFID tag 46 is used in place of an IC memory. The configuration in FIG. 12A corresponds to that shown in FIG. 7, and the configuration in FIG. 12B corresponds to that shown in FIG. 10. As shown in FIGS. 2B and 5B, the RFID tag 46 is put on information display section 13 and they are integrated by using the laminate film and the adhesives 47 and 48. Others are similar to the first and second specific examples and therefore will not be discussed again. The configuration of the information writer 21 is also similar to that in the first and second specific examples and therefore will not be discussed again.

Figure 13:
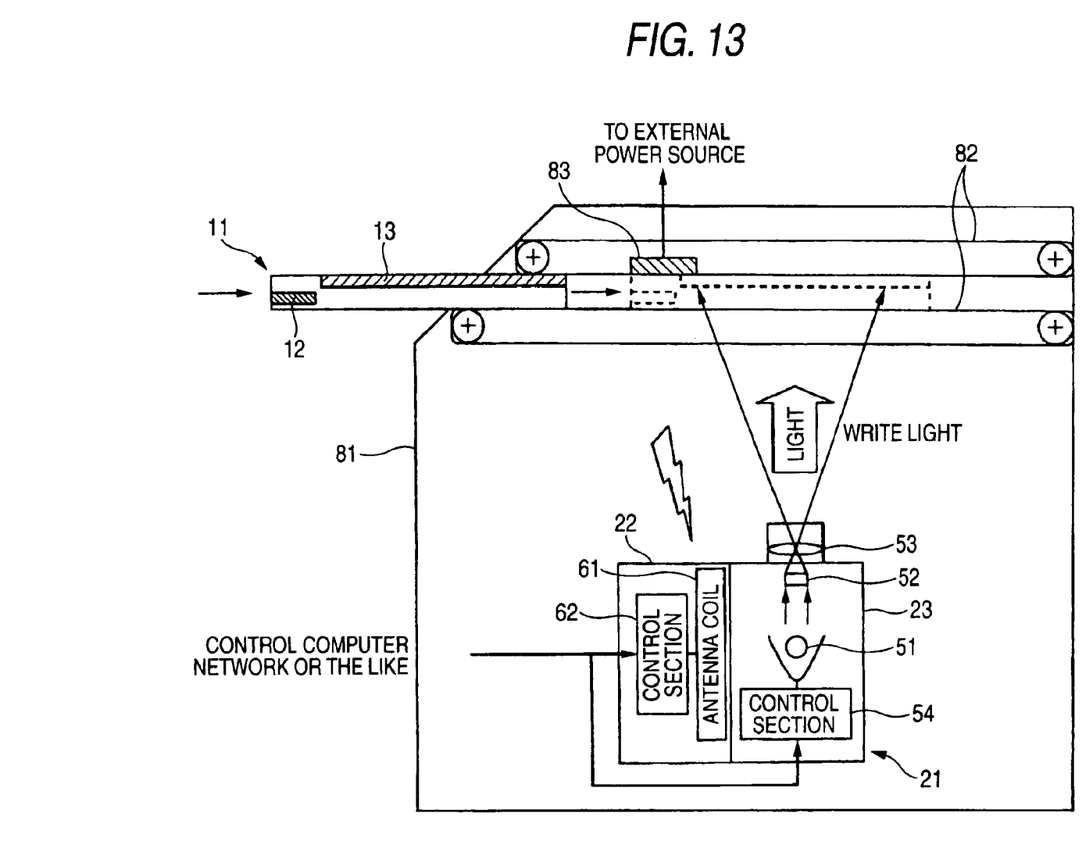
FIG. 13 is a configuration drawing to show a first application example of display and record medium and information writer of the invention.

Application examples of display and record medium and information writer of the invention will be discussed. FIG. 13 is a configuration drawing to show a first application example of display and record medium and information writer of the invention. Parts similar to those previously described with reference to FIG. 8 are denoted by the same reference numerals in FIG. 13 and will not be discussed again. Numeral 81 denotes a ticket gate, numeral 82 denotes a card transport belt, and numeral 83 denotes an electrode terminal. The first application example is an example of applying the display and record medium and the information writer of the invention to a ticket gate of a station, an airport, an event site, etc.

As shown in FIG. 13, the display and record medium 11 of the invention is applied to a train ticket, a commutation ticket, a plane ticket, an event ticket, a prepaid card, etc. The information writer 21 of the invention is built in the ticket gate 81. Here, the writer previously described with reference to FIG. 8 is used as the information writer 21 built in the ticket gate 81. Of course, the information writer of any other configuration such as that previously described with reference to FIG. 11 may be used.

In the configuration shown in FIG. 13, the display and record medium 11 of the invention is inserted into a card slot of the ticket gate 81. In the ticket gate 81, the display and record medium 11 is transported to an ejection port at the rear of the ticket gate 81 while a nondisplay area at an end of the display and record medium 11 is held on the card transport belt 82. While the display and record medium 11 is being transported, the display information rewrite section 23 of the information writer 21 writes display information into the information display section 13 of the display and record medium 11. The electrode terminal 83 is placed on a route for holding and transporting the display and record medium 11 on the card transport belt 82. The electrode terminal 83 can be connected to an external power supply for applying voltage to the external electrode terminal of the display and record medium 11 (the external electrode terminal 44 in FIG. 7, etc.,) synchronously when the display information rewrite section 23 irradiates light. Conversely, light can also be irradiated at a timing when such voltage application is made possible for writing display information.

Together with rewriting the display information, the digital information rewrite section 22 can also communicate with the digital information record section 12 of the display and record medium 11 for reading and rewriting record information. The display and record medium 11 in which the record information and the display information have been rewritten is ejected from the card ejection port.

Hitherto, for example, a prepaid card having only a digital information record section 12 has existed. However, no display function is provided and the user cannot know the remaining amount simply by seeing the card. The information display section 13 is provided as in the invention, whereby the remaining amount, the riding station name, date and time, and the like, for example, can be displayed, so that the convenience of the card can be enhanced. The display information as well as the record information can be rewritten instantaneously in noncontact. Excellent durability is also provided.

Figure 14:
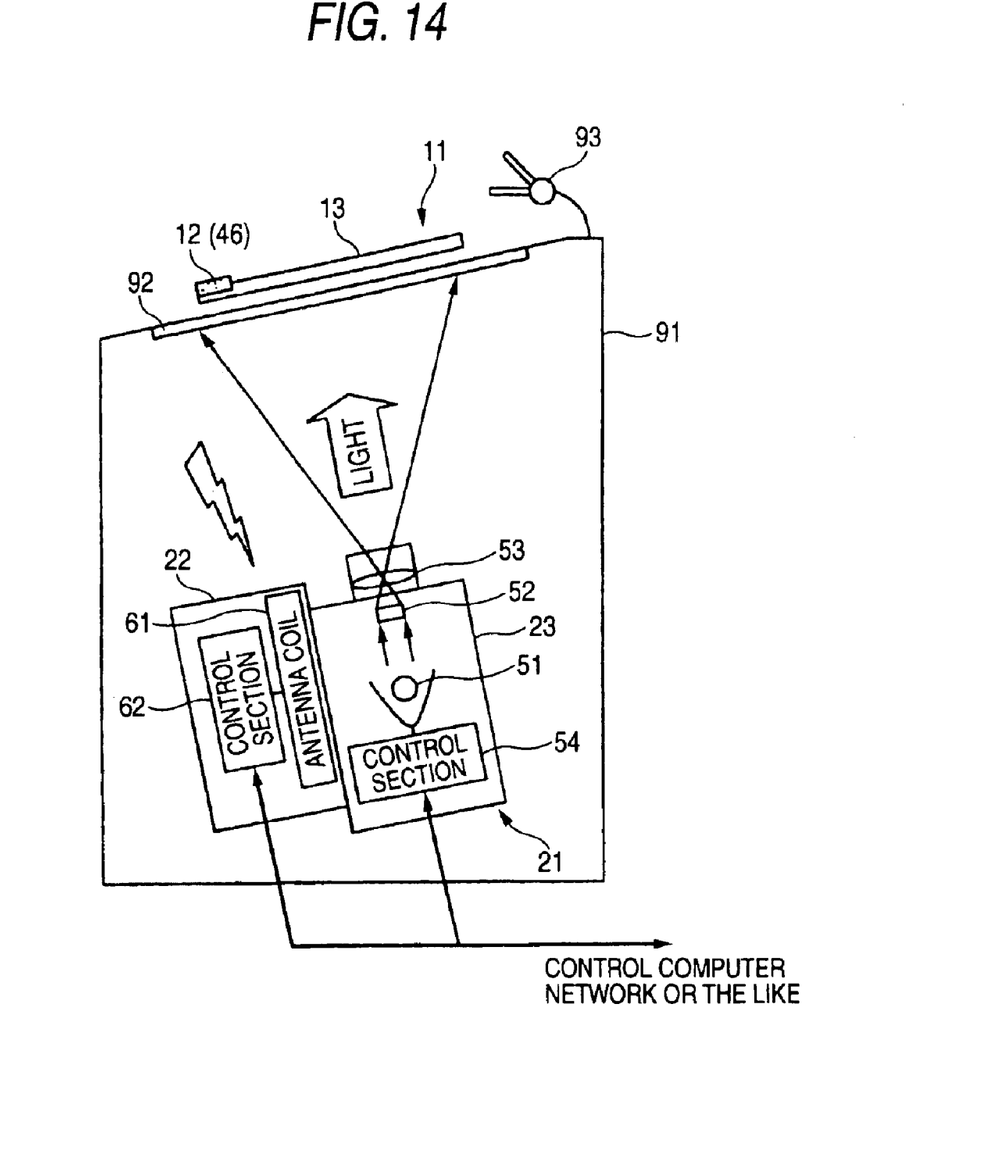
FIG. 14 is a configuration drawing to show a second application example of display and record medium and information writer of the invention.

FIG. 14 is a configuration drawing to show a second application example of display and record medium and information writer of the invention. Parts similar to those previously described with reference to FIG. 8 are denoted by the same reference numerals in FIG. 14 and will not be discussed again. Numeral 91 denotes an information terminal, numeral 92 denotes a dimming screen, and numeral 93 denotes a voltage applying clip. The second application example is an application example of a configuration as the information terminal 91 and provides a system wherein display and record medium 11 is held over the information terminal as shown in FIG. 14 for receiving a work instruction and information relevant to the display and record medium 11 on demand.

Information writer 21 is contained in the information terminal 91 connected to a network. Here, the information writer previously described with reference to FIG. 8 is used as the information writer 21. However, the information writer of any other configuration such as that previously described with reference to FIG. 11 may be used.

When the user brings the display and record medium 11 close to the information terminal 91, the digital information rewrite section 22 identifies an ID number, etc., of the display and record medium 11. Data in a database is checked through an external computer based on the ID number of the display and record medium 11 identified. Then, record information and display information to be written are acquired. The display information is displayed on the dimming screen 92 implemented, for example, as liquid crystal (for example, umlight manufactured by Nihon Sheet Glass Co., Ltd.) from the display information rewrite section 23. To write the information displayed on the dimming screen 92 into the display and record medium 11, from a power supply contained in the information terminal 91, external electrode terminal of the display and record medium 11 (the external electrode terminal 44 in FIG. 7, etc.,) is clipped by the voltage applying clip 93 and the medium is held over the screen and a voltage is applied. Also, voltage is applied to the dimming screen 92 for changing the dimming screen 92 from a light scattering state to a transparent state. An optical pattern traveling in straight lines through the transparent dimming screen 92 is irradiated to photoconductive layer 37 of the display and record medium 11 (the photoconductive layer 37 in FIG. 7, etc.,) and a sharp image is formed on display layer (the display layer 32 in FIG. 7, etc.,).

In the example, digital information record section 12 is used only to identify the ID number of the display and record medium 11. The digital information rewrite section 22 of the information writer 21 does not rewrite new record information. Therefore, a device such as an RFID tag into which new information is not rewritten can be applied as the digital information record section 12 of the display and record medium 11. Of course, a configuration in which various pieces of information are stored as record information and the record information is updated is also possible. For example, information of the file name, address, etc., of the display information written into the information display section 13 can be recorded.

The configuration of the second application example can be applied to the use wherein patients consulting doctors in a hospital are identified based on ID tags and the next medical examination guide is displayed or accounting information is displayed. A use method of identifying the attributes of each visitor in an exhibition hall (engineer profession or sales profession, previously examined interesting exhibition information, etc.,) and then displaying booth information fitted for visitor is also available. A similar use method is also possible in locations for displaying some guide information, such as a museum, an art museum, and a tourist attraction.

Further, bargain information on the day, good buy information responsive to the steady customer level, etc., can also be presented in a supermarket, a shopping center, etc. Further, the example can also be used as temporary display medium and writer of secret information, etc., which should be disclosed only for specific persons in financial institutions of banks, etc., and administrative bodies of city offices, etc. In the case, if a log of a reading history, etc., is left in a database on a network through an RFID tag or its ID, illegal use, etc., can also be easily tracked.

The system as described above can be used not only as a configuration wherein specific terminals and a computer network are connected, but also as a configuration wherein while reading information at an information terminal existing in any of locations connected on a network, the user copies the same image to a display and record medium and moves and rewrites it into another information terminal; more promising use is possible.

As seen from the description made above, according to the invention, it is possible to construct the display and record medium into which not only new digital information, but also new display information can be rewritten in noncontact and application systems of the display and record medium. According to the invention, the placement flexibility of the display and record medium at the rewriting time of data and display information is increased and it is made possible to rewrite information at high speed. Since both digital information and display information are rewritten in noncontact, the operation modes to rewrite both digital information and display information become close to each other, and design having consistency as noncontact apparatus and the operation style easily understood for the user can be realized. The rewritability of display information well balanced with the number of rewrite times into noncontact memory can be provided. The invention provides various advantages as described.

What is claimed is:

1. A display and record medium comprising:
   a digital information record unit for receiving first information from a source without being in physical contact with the source, the digital information record unit for recording the first information; and
   an information display unit for receiving second information from the source without being in physical contact with the source, the information display unit for displaying the second information, the information display unit comprising:
   first and second electrode substrates;
   a liquid crystal display layer disposed on the first electrode substrate;
   a photoconductive layer disposed on the second electrode substrate; and
   an interface layer disposed between the liquid crystal display and the photoconductive layer, wherein at least one of the first and second electrode substrates has a light transmission property, and the interface layer is a light absorbing layer.

2. The display and record medium according to claim 1, wherein an optical pattern is irradiated to rewrite the second information without physical contact with the source.

3. The display and record medium according to claim 1, wherein the digital information record medium has one of electromagnetic, magnetic, and optical communication units, and the communication unit executes the rewriting of the first information in the digital information record unit.

4. The display and record medium according to claim 1, wherein the first electrode substrate includes an external electrode terminal, and a transparent card substrate having IC memory is diagnosed on the second electrode substrate.

5. A display and record medium comprising:
   a digital information record unit for receiving first information from a source without being in physical contact with the source, the digital information record unit for recording the first information; and
   an information display unit for receiving second information from the source without being in physical contact with the source, the information display unit for displaying the second information, the information display unit comprising:
   a first electrode substrate;
   a liquid crystal display layer disposed on the first electrode substrate;
   an interface layer disposed on the liquid crystal display layer;
   a photoconductive layer disposed on the interface layer;
   a second electrode substrate on the photoconductive layer; and
   a light absorbing layer disposed on the second electrode substrate, wherein at least one of the first and second electrode substrates has a light transmission property, and the interface layer is an isolation layer.

6. The display and record medium according to claim 5, wherein the first information rewriting into the digital information record unit and the second information rewriting into the information display unit can be executed concurrently.

7. The display and record medium according to claim 5, wherein an optical pattern is irradiated to rewrite the second information without physical contact with the source.

8. The display and record medium according to claim 5, wherein the digital information record medium has one of electromagnetic, magnetic and optical communication units, and the communication unit executes the rewriting of the first information in the digital information record unit.

9. The display and record medium according to claim 5, wherein the first electrode substrate includes an external electrode terminal, and a transparent card substrate having IC memory is disposed on the light absorbing layer.

10. The display and record medium according to claim 1, wherein the first information rewriting into the digital information record unit and the second information rewriting into the information display unit can be executed concurrently.

11. An information displaying and recording system comprising:
    a display and record medium including a digital information record unit and an information display unit; and
    a writer including a digital information rewrite unit and a display information rewrite unit, wherein:
    the digital information record unit receives first information from the digital information rewrite unit without being in physical contact with the digital information rewrite unit and records the first information, the digital information rewrite unit executes one of electromagnetic, magnetic and optical communications to rewrite the recorded first information in the digital information record unit without being in physical contact with the digital information record unit, the information display unit receives second information from the display information rewrite unit without being in physical contact with the display information rewrite unit and displays the received second information, the display information rewrite unit rewrites the displayed second information in the information display unit without being in physical contact with the information display unit, the information display unit includes:
  first and second electrode substrates,
  a liquid crystal display layer disposed on the first electrode substrate,
  a photoconductive layer disposed on the second electrode substrate, and
  an interface layer disposed between the liquid crystal display and the photoconductive layer, at least one of the first and second electrode substrates has a light transmission property, and the interface layer is a light absorbing layer.

12. The information displaying and recording system according to claim 11, wherein the digital information rewrite unit conducts one of electromagnetic, magnetic and optical communications to read the recorded first information from the digital information record unit of the display and record medium.

13. The information displaying and recording system according to claim 11, wherein the rewriting of the recorded first information in the digital information record unit of the display and record medium of the digital information rewrite unit and the rewriting of the displayed second information in the information display unit of the display and record medium by the display information rewrite unit are concurrently executed.

14. An information displaying and recording system comprising:
  a display and record medium including a digital information record unit and an information display unit; and
  a writer including a digital information rewrite unit and a display information rewrite unit, wherein:

the digital information record unit receives first information from the digital information rewrite unit without being in physical contact with the digital information rewrite unit and records the first information, the digital information rewrite unit executes one of electromagnetic, magnetic and optical communications to rewrite the recorded first information in the digital information record unit without being in physical contact with the digital information record unit, the information display unit receives second information from the digital information rewrite unit without being in physical contact with the display information rewrite unit and displays the received second information, the display information rewrite unit rewrites the displayed second information in the information display unit without being in physical contact with the display information unit, the information display unit includes:
  a first electrode substrate,
  a liquid crystal display layer disposed on the first electrode substrate,
  an interface layer disposed on the liquid crystal layer,
  a photoconductive layer disposed on the interface layer,
  a second electrode substrate on the photoconductive layer, and
  a light absorbing layer disposed on the second electrode substrate, at least one of the first and second electrode substrates has a light transmission property, and the interface layer is an insulation layer.

15. The information displaying and recording system according to claim 14, wherein the digital information rewrite unit conducts one of electromagnetic, magnetic and optical communications to read the recorded first information from the digital information record unit of the display and record medium.

16. The information displaying and recording system according to claim 14, wherein the rewriting of the recorded first information in the digital information record unit of the display and record medium of the digital information rewrite unit and the rewriting of the displayed second information in the information display unit of the display and record medium by the display information rewrite unit are concurrently executed.

* * * * *